United States Patent Office 2,828,903
Patented Apr. 1, 1958

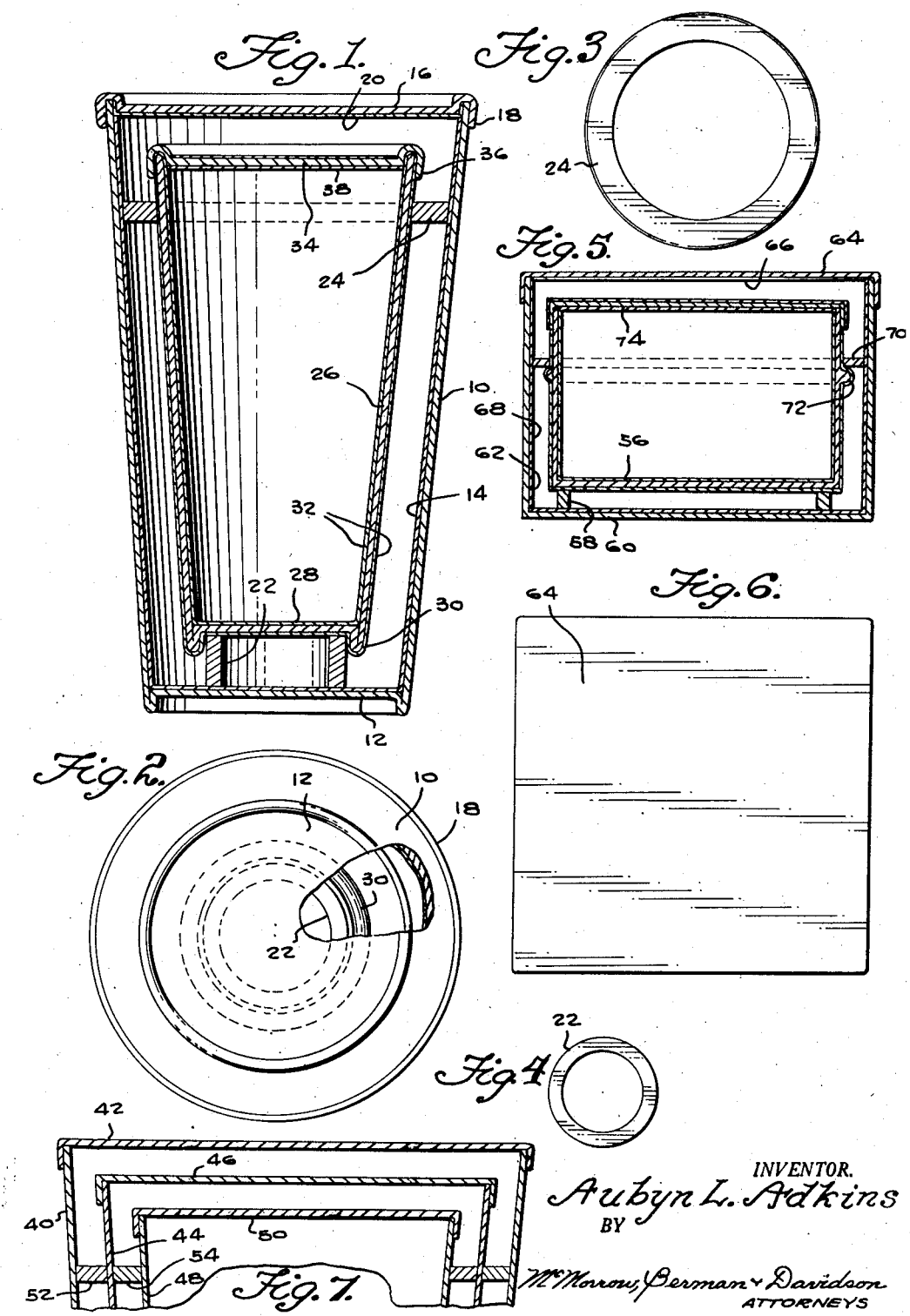

2,828,903

DISPOSABLE HEAT INSULATED CONTAINER FOR LIQUIDS OR SOLIDS

Aubyn L. Adkins, Rolling Hills, Calif.

Application May 11, 1956, Serial No. 584,268

2 Claims. (Cl. 229—14)

The present invention relates generally to containers. In a narrower sense, the invention has reference to a readily disposable, heat insulated container for liquids or solids, such as restaurant-prepared foods.

Substantial sales are made daily, in restaurants and other establishments preparing foods, of liquids, solids, or semi-solids intended for "carry out" or delivery.

Most usually, disposable, single thickness cartons of cardboard or other fibrous material are employed for packaging such foods, and while these are found acceptable when the consumption of the food at its destination occurs within a very short time after the initial packaging thereof in the cartons, the arrangement has not been found to be satisfactory where the span of time between packaging and consumption is excessive.

The main object of the present invention, accordingly, is to provide a disposable container of insulated construction, which will be particularly adapted for the transportation of hot or cold materials, usually liquids and usually consumable liquids, an example being hot coffee carried from a source of supply such as a restaurant, to a distant point such that the coffee would cool to an excessive degree if carried in an ordinary paper cup or cardboard container.

The device proposed for carrying out this object, summarized briefly, includes an inner container having insulation on its inner and outer surfaces, said insulation extending not only over the side walls of the inner container but also over the top and bottom thereof. The device further includes an outer container also having a coating of insulation on its side walls, top and bottom. Within the outer container, there is provided a bottom support ring which supports the inner container in spaced relation to the bottom of the outer container, as well as a side support ring which spaces the inner container at its sides from the side wall of the outer container, not only for the purpose of preventing tilting of the inner container within the outer container, but also for the purpose of providing a dead air space almost completely surrounding the inner container.

The device can be made in any desired shape, and in another form of the invention, coatings of insulation material can be omitted, with the insulation deriving wholly from the nesting of a plurality of inner containers within an outer container in spaced relation to each other and to said outer container, to provide a multiplicity of dead air spaces, with the innermost container holding the material to be kept hot or cold as the case may be.

Another object of importance is to provide a device of the nature referred to which is particularly designed to facilitate assembly of the several receptacles with one another, the construction being such as to permit a separate manufacture of said receptacles, with assembly being effected at the point of packaging of the foods or other materials in the receptacles for delivery.

Other objects will appear from the following description, the claims appended thereto, and from the annexed drawing in which like reference characters designate like parts throughout the several views and wherein:

Figure 1 is a longitudinal sectional view through one form of insulated container formed according to the present invention;

Figure 2 is a bottom plan view, portions being broken away;

Figure 3 is a plan view of the side spacer ring per se;

Figure 4 is a reduced plan view of the bottom spacer ring per se;

Figure 5 is a sectional view similar to Figure 1 through a modified form of the device;

Figure 6 is a top plan view of the container shown in Figure 5; and

Figure 7 is a fragmentary longitudinal sectional view through the upper portion of a second modification.

Referring to the drawings in detail, in the form of the invention shown in Figure 1 there is provided an outer receptacle 10 which can be of any desired shape. In the illustrated embodiment, by way of example, the outer container tapers toward the lower end thereof, and is of circular cross section at all points along its length. However, as will be presently apparent, the particular shape of the receptacle can be varied as desired.

The receptacle is formed of a readily disposable material, such as cardboard, and is provided integrally or otherwise at its lower end with an upwardly offset bottom wall 12.

Lining the side wall and bottom of the outer receptacle is a coating 14 of heat or cold insulation. In the illustrated embodiment, aluminum foil is employed for this purpose, but it is believed that other types of heat insulation material can be employed to equal advantage.

The receptacle 10 is provided with a removable lid 16, having at its periphery a downwardly turned flange to detachably, sealably connect the lid to the body of the receptacle. The lid 16 is provided on its inner surface with a coating 20 of insulation, such as aluminum foil, said insulation terminating at the inner periphery of flange 18.

Removably positioned upon the bottom wall 12, centrally thereof, is an upstanding spacer ring 22 shown per se in Figure 4. Also insertable in the outer container is an upper spacer ring 24 lying in a plane normal to the long axis of the outer receptacle. The ring 24, like ring 22, may initially be merchandised separately from the outer receptacle, to be assembled therewith and with an inner container 26 when the inner container or receptacle 26 is to be assembled with the outer receptacle.

The inner receptacle 26 is substantially smaller than the outer receptacle, both in transverse dimension and in length. Preferably, the inner receptacle is shaped generally similarly to the outer receptacle, that is, if the outer receptacle is tapered and of circular cross section, the inner receptacle should be similarly formed.

The inner receptacle 26 is provided with a bottom wall 28, resting upon the ring 22. At the periphery of the bottom wall there is a depending circumferential flange 30 which may be formed by folding of the material of the inner receptacle where the side wall thereof intersects with the bottom wall. The depending flange 38 is slightly greater in diameter than the ring 22, so that at its lower end, the inner receptacle is held against lateral deviation relative to said ring 22.

Coatings of insulation are applied to the inner and outer surfaces of the inner receptacle, in the form of aluminum foil 32, said foil extending over the full areas of the side wall, bottom wall, and lid 34 of the inner receptacle. The lid 34 has a circumferential, downwardly opening, channeled lip 36, to sealably engage the lid with the body of the inner receptacle, and as shown in Figure 1 coverings of aluminum foil 38 or similar insulation are applied to the outer end surfaces of the lid.

It will be seen that there is provided a dead air space between the inner and outer receptacles, almost completely surrounding the inner receptacle, the only locations at which said dead air space does not exist being the points of contact between the inner receptacle and the spacer rings 22, 24. The invention thus utilizes not only the insulating liners or coverings of the outer and inner receptacles for the purpose of maintaining to the maximum extent the temperature of the material applied in the inner receptacle, but also makes use of the principle that a dead air space has a low co-efficient of heat conductivity. It is further known that when said air space is faced on both sides with a smooth bright foil or aluminum or other material the coefficient of heat conductivity is reduced to an even greater extent. Still further, it will be apparent that there is minimum contact between the inner receptacle and the means supporting the same in spaced relation to the outer receptacle, thus making use of the principle that heat loss or gain is a function of surface area, so that consequently the minimum surface area shown would be more efficient.

In Figure 7 there is shown a construction wherein coatings of insulation are eliminated, although they could be used in this form of the invention as well as in the form of Figure 1. In this form, the outer receptacle has been designated at 40, and has a lid 42. An intermediate receptacle 44 is spaced inwardly from the top, bottom, and side wall of the outer receptacle, and has a lid 46. An inner receptacle 48 is spaced inwardly from the intermediate receptacle, in the same way, and has a lid 50, the inner receptacle being adapted to hold the material the temperature of which is to be maintained for a maximum period of time.

To space the several receptacles from one another, there are provided upper spacer rings 52, 54 respectively extending about the intermediate and inner receptacles, and bottom spacer rings would be employed in the same manner as shown in Figure 1, between the bottom wall of the outer and intermediate receptacle, and between the bottom walls of the intermediate and inner receptacles.

In Figures 5 and 6 there is shown another modification, which is basically similar to the first form of the invention except for the shape of the receptacles. In this form of the invention the receptacles are of square or rectangular formation, and include an inner receptacle 56 supported upon a rectangular spacer 58 that rests upon the bottom wall of the outer receptacle 50. A rectangular side wall 62 is provided upon the outer receptacle, and lining the side wall and bottom of the outer receptacle is a coating of insulation 68 such as aluminum foil. A lid 64 is applied to the outer receptacle, and is provided on its inner surface with a coating of insulation 66.

An upper spacer 70 is of rectangular formation, and is limited against downward movement within the outer receptacle by a peripheral, outwardly directed lip 72 formed in the side wall of the inner receptacle, as by crimping the material of which the inner receptacle is formed. A lid 74 is applied to the inner receptacle, and coatings of insulation are applied to both the inner and outer surfaces of the lid and body portion of the inner receptacle.

The sizes and shapes of the device can, of course, be varied almost without number, as can the material of which the receptacles can be formed. It is important, of course, that the material, particularly of the inner receptacle, have sufficient wet strength to hold a warm liquid, but this would be true only when there is not used an insulation such as aluminum foil. When aluminum foil is applied as a liner to the inner receptacle, it is not necessary that the material of which the body and lid of the inner receptacle are formed have any wet strength, since the aluminum foil is impervious to the package of liquid, and is not affected in any way thereby.

It is believed apparent that the invention is not necessarily confined to the specific use or uses thereof described above since it may be utilized for any purpose to which it may be suited. Nor is the invention to be necessarily limited to the specific construction illustrated and described, since such construction is only intended to be illustrative of the principles it being considered that the invention comprehends any minor change in construction that may be permitted within the scope of the appended claims.

What is claimed is:

1. A disposable, insulated container comprising an upstanding, hollow body open at its upper end and a lid closing said upper end of the body; a first spacer ring lying in a plane normal to the length of the body intermediate the opposite ends of the body; an inner receptacle including an upstanding, hollow body open at its upper end and a lid closing the upper end of the second named body, the body of the inner receptacle corresponding in shape to but having dimensions substantially smaller than the outer receptacle, said spacer ring receiving the inner receptacle to center the same within the outer receptacle in a position in which the side walls and lids of the receptacles are spaced apart to define a dead air space extending about the inner receptacle at the sides and top thereof, said body of the inner receptacle including a depending circumferential flange at its lower end; and a second spacer ring interposed between and providing a dead air space between the lower ends of said bodies, said second spacer ring fitting snugly into the depending flange to cooperate with the flange in holding the lower end of the inner receptacle centered within the outer receptacle.

2. A disposable, insulated container comprising an upstanding, hollow body open at its upper end and a lid closing said upper end of the body; a first spacer ring lying in a plane normal to the length of the body intermediate the opposite ends of the body; an inner receptacle including an upstanding, hollow body open at its upper end and a lid closing the upper end of the second named body, the body of the inner receptacle corresponding in shape to but having dimensions substantially smaller than the outer receptacle, said spacer ring receiving the inner receptacle to center the same within the outer receptacle in a position in which the side walls and lids of the receptacles are spaced apart to define a dead air space extending about the inner receptacle at the sides and top thereof, said body of the inner receptacle including a depending circumferential flange at its lower end; and a second spacer ring interposed between and providing a dead air space between the lower ends of said bodies, said second spacer ring fitting snugly into the depending flange to cooperate with the flange in holding the lower end of the inner receptacle centered within the outer receptacle, said inner receptacle including a reflective coating overlying substantially the full area of the outer surface of the inner receptacle and extending between the side wall of the inner receptacle and the first named spacer ring, and between the bottom of the inner receptacle and the second named spacer ring, the outer receptacle including a reflective coating on the inner surface thereof extending between the first named spacer ring and the side wall of the outer receptacle and between the bottom end of the outer receptacle and the second named spacer ring.

References Cited in the file of this patent

UNITED STATES PATENTS

| Number | Name | Date |
| --- | --- | --- |
| 889,992 | Van Wye | June 9, 1908 |
| 1,480,827 | McColl | Jan. 15, 1924 |
| 2,102,886 | Conner | Dec. 21, 1937 |
| 2,591,578 | McNealy et al. | Apr. 1, 1952 |
| 2,695,744 | Guttuso | Nov. 30, 1954 |

FOREIGN PATENTS

| Number | Country | Date |
| --- | --- | --- |
| 606,606 | Germany | Dec. 6, 1934 |